United States Patent
Eriksson et al.

(10) Patent No.: US 12,167,368 B2
(45) Date of Patent: Dec. 10, 2024

(54) MULTI-SOURCE QUASI COLLOCATION OF REFERENCE SIGNALS

(71) Applicant: Telefonaktiebolaget LM Ericsson (publ), Stockholm (SE)

(72) Inventors: Erik Eriksson, Linköping (SE); Pål Frenger, Linköping (SE); Claes Tidestav, Bålsta (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 38 days.

(21) Appl. No.: 17/266,285

(22) PCT Filed: Aug. 9, 2019

(86) PCT No.: PCT/EP2019/071461
§ 371 (c)(1),
(2) Date: Feb. 5, 2021

(87) PCT Pub. No.: WO2020/030795
PCT Pub. Date: Feb. 13, 2020

(65) Prior Publication Data
US 2021/0306985 A1 Sep. 30, 2021

Related U.S. Application Data

(60) Provisional application No. 62/717,229, filed on Aug. 10, 2018.

(51) Int. Cl.
*H04W 72/02* (2009.01)
*H04B 17/318* (2015.01)
(Continued)

(52) U.S. Cl.
CPC .......... *H04W 72/02* (2013.01); *H04B 17/318* (2015.01); *H04W 56/001* (2013.01); *H04W 72/54* (2023.01)

(58) Field of Classification Search
None
See application file for complete search history.

(56) References Cited

U.S. PATENT DOCUMENTS

2011/0235809 A1* 9/2011 Schuijers ............... H04S 1/00
381/17
2019/0230646 A1* 7/2019 Li .................... H04W 72/0446
(Continued)

FOREIGN PATENT DOCUMENTS

| EP | 3471318 A1 | 4/2019 |
| WO | 2018128410 A1 | 7/2018 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.2.2, Jun. 2018, 1-791.
(Continued)

*Primary Examiner* — Kenny S Lin
*Assistant Examiner* — Rodrick Mak
(74) *Attorney, Agent, or Firm* — Murphy, Bilak & Homiller, PLLC

(57) ABSTRACT

A method of controlling radio transmission in a wireless communication network is described, the method comprising a radio device (10; 400; 700) receiving an indication of a set of first signals (31, 32, 33, 34, 35, 36) for associating the set of first signals (31, 32, 33, 34, 35, 36) with a second signal. The method comprises the radio device (10; 400; 700) receiving at least one of the first signals (31; 32, 33, 34, 35, 36); and in response to the indication, the radio device (10; 400; 700) estimating at least one parameter of the second signal based on the at least one received first signal. The method further comprises, based on the at least one estimated parameter, the radio device (10; 400; 700) pro-
(Continued)

cessing at least one radio transmission (21) from the wireless communication network.

21 Claims, 5 Drawing Sheets

(51) Int. Cl.
*H04W 56/00* (2009.01)
*H04W 72/54* (2023.01)

(56) References Cited

U.S. PATENT DOCUMENTS

| | | | | |
|---|---|---|---|---|
| 2019/0342035 | A1* | 11/2019 | Zhang | H04L 1/0073 |
| 2020/0213997 | A1* | 7/2020 | Lu | H04L 1/16 |
| 2020/0220680 | A1* | 7/2020 | Yamada | H04W 16/28 |
| 2020/0336194 | A1* | 10/2020 | Karjalainen | H04L 5/0044 |
| 2021/0076267 | A1* | 3/2021 | Cirkic | H04B 7/022 |

OTHER PUBLICATIONS

3GPP, "3rd Generation Partnership Project; Technical Specification Group Radio Access Network; NR; Physical layer procedures for data (Release 15)", 3GPP TS 38.214 V15.2.0, Jun. 2018, 1-95.

Ericsson, "On simultaneous reception of physical and reference signals across CCs", 3GPP TSG RAN WG1 Meeting #92bis, R1-1804977, Sanya, China, Apr. 16-20, 2018, 1-12.

Ericsson, "On simultaneous reception of physical and reference signals across CCs", 3GPP TSG-RAN WG1 Meeting #93, R1-1806219, Busan, Korea, May 21-25, 2018, 1-5.

3GPP, "3GPP TS 36.213 V15.2.0", 3rd Generation Partnership Project; Technical Specification Group Radio Access Network; Evolved Universal Terrestrial Radio Access (E-UTRA); Physical layer procedures (Release 15) The present, Jun. 2018, 1-541.

Zte, et al., "Remaining details on QCL", 3GPP TSG RAN WG1 meeting #92, R1-1801590, Athens, Greece, Feb. 26-Mar. 2, 2018, 1-5.

* cited by examiner

MULTI-SOURCE QUASI COLLOCATION OF REFERENCE SIGNALS

TECHNICAL FIELD

The present disclosure relates to methods for controlling radio transmissions in a wireless communication network and to corresponding devices and systems.

BACKGROUND

In wireless communication networks, such as wireless communication networks based on the LTE (Long Term Evolution) technology specified by 3GPP ($3^{rd}$ Generation Partnership project), various types of signals are being transmitted to support transmissions between a UE and a node of the wireless communication network. For example, in order to connect to a network or to detect signals from network nodes, a UE use one or more synchronization signals to acquire synchronization with respect to one or more access nodes of the wireless communication network. The UE may use synchronization signals for tuning a local time/frequency reference of the UE relative to a time/frequency reference of the network, to thereby estimate an appropriate timing for processing signals received from the wireless communication network. For example, the LTE technology supports a Primary Synchronization Signal (PSS) and a Secondary Synchronization Signal (SSS). Similarly, various types of such supporting signals are also being defined for the 5th Generation (5G) New Radio (NR) technology currently being developed by 3GPP. One aspect of the NR technology is an improved support for beamforming and support of both digital and analog radio transceivers. In the NR technology, beamforming is intended to be supported for data channels as well as for common and dedicated control channels. Supporting signals in the NR technology include synchronization signal, in particular a PSS and an SSS. Further, a Physical Broadcast channel (PBCH) provides a subset of system information for random access. In the NR technology a combination of the PSS, SSS and the PBCH is also referred to as an SS/PBCH block or SS block (SSB). Another supporting signal in the NR technology is a Tracking Reference Signal (TRS), sometimes also referred to as CSI-RS for tracking ("Channel State Information Reference Signal for tracking").

In the NR technology the supporting signals may be used in the following manner in a synchronization and access procedure: The PSS may be used for detection of a signal transmitted from an access node (in the NR technology referred to as gNB) when there is a high frequency offset between the local time/frequency reference of the UE and the time/frequency reference of the access node, e.g., an offset up to tens of ppm, resulting in an unknown symbol and frame timing. Here, the PSS may be used as a coarse frequency reference. Based on the PSS, estimation of the time/frequency offset may be implemented on the basis of a time-domain sliding matched filter operation with respect to different hypotheses of time and frequency offset. A peak at the matched filter output indicates a presence of a PSS and the corresponding hypotheses of time and frequency offsets yield the required alignment parameters. Similar to the LTE technology, the PSS of the NR technology may be based on a Zadoff-Chu sequence. The SSS may be used for refined estimation of the time/frequency offset and also provides some basic network information, such as a cell ID (cell identifier). The PBCH provides a subset of system information to be used for random access.

The TRS may be used for UE time and frequency synchronization as well. Further, the TRS can be used for Doppler spread estimation and delay spread estimation. The TRS may enable highly accurate delay and frequency synchronization and may be used by the UE to position an FFT (Fast Fourier Transform) window for processing received signals to minimize inter-carrier interference and inter-symbol interference. The estimated Doppler spread, and delay spread may be used, together with an SNR (signal to noise ratio) estimate, to optimize time and frequency filtering for channel estimation. Accordingly, the TRS has a direct impact on demodulation performance of the UE.

In order to improve demodulation performance, a UE can be configured with a QCL (quasi co-location) relationship between two signals. For the NR technology, usage of QCL is for example defined in 3GPP TS 38.214 V15.2.0 (2018-06), section 5.1.5. Here, two signals are configured to be quasi co-located, i.e., a QCL relationship of the signals is defined, if they have the same large-scale properties, for instance in terms of Doppler shift, Doppler spread, average delay spread, or average delay. For the LTE technology, usage of QCL is for example defined in 3GPP TS 36.213 V15.2.0 (2018-06), section 7.1.10.

The network can signal to the UE that two antenna ports have a QCL relationship with respect to one or more parameters, such as Doppler shift and/or average delay, e.g., using RRC signalling. If the UE knows that two antenna ports have such QCL relationship the parameter(s) based on one of the antenna ports and use the same estimate when receiving a signal over the other antenna port. For instance, if antenna ports A and B are configured with a QCL relationship with respect to average delay, the UE can estimate the average delay from the signal received at antenna port A and assume that the signal received at antenna port B has the same average delay. The signal used to provide the estimate can be referred to a QCL source, and the signal on which the estimate is applied can be referred to as QCL target.

According to 3GPP TS 38.214 V15.2.0, four types of QCL relationships between a QCL source and QCL target can be defined:

QCL Type A: {Doppler shift, Doppler spread, average delay, delay spread}
QCL Type B: {Doppler shift, Doppler spread}
QCL Type C: {average delay, Doppler shift}
QCL Type D: {Spatial Rx parameter}

QCL type D was introduced to facilitate beam management with analog beamforming and is also referred to as spatial QCL. For example, if two antenna ports are configured with a spatial QCL relationship, the UE can use the same spatial beam to receive signals over the antenna ports.

In typical practical situations, it may however be necessary to pairwise configure QCL relationships for many signals in order to achieve a desired improvement of UE performance, which may be cumbersome and difficult to manage from the network side.

Accordingly, there is a need for techniques which allow for efficient utilization of supporting signals transmitted in a wireless communication network.

SUMMARY

According to an embodiment of the present disclosure, a method of controlling radio transmission in a wireless communication network is provided. According to the method, a radio device receives an indication of a set of first signals for associating the set of first signals with a second signal. The radio device receives at least one of the first signals. In response to the indication, the radio device estimates at least one parameter of the second signal based on the at least one received first signal. Based on the at least one estimated parameter, the radio device processes at least one radio transmission from the wireless communication network.

According to a further embodiment of the present disclosure, a method of controlling radio transmission in a wireless communication network is provided. According to the method, a node of the wireless communication network determines a set of first signals having similar properties as a second signal when being received by a radio device. Further the node provides an indication of the set of first signals to the radio device for associating the set of first signals with the second signal. The association allows the radio device to estimate at least one parameter of the second signal based on at least one of the first signals.

According to a further embodiment of the present disclosure, a radio device is provided. The radio device is configured to receive an indication of a set of first signals for associating the set of first signals with a second signal. Further, the radio device is configured to receive at least one of the first signals. Further, the radio device is configured to, in response to the indication, estimate at least one parameter of the second signal based on the at least one received first signal. Further, the radio device is configured to, based on the at least one estimated parameter, process at least one radio transmission from the wireless communication network.

According to a further embodiment of the present disclosure, a radio device is provided. The radio device comprises at least one processor and a memory containing instructions executable by said at least one processor, whereby the radio device is operative to receive an indication of a set of first signals for associating the set of first signals with a second signal. Further, the memory contains instructions executable by said at least one processor, whereby the radio device is operative to receive at least one of the first signals. Further, the memory contains instructions executable by said at least one processor, whereby the radio device is operative to, in response to the indication, estimate at least one parameter of the second signal based on the at least one received first signal. Further, the memory contains instructions executable by said at least one processor, whereby the radio device is operative to, based on the at least one estimated parameter, process at least one radio transmission from the wireless communication network.

According to a further embodiment of the present disclosure, a node for a wireless communication network is provided. The node is configured to determine a set of first signals having similar properties as a second signal when being received by a radio device. Further, the node is configured to provide an indication of the set of first signals to the radio device for associating the set of first signals with the second signal. The association allows the radio device to estimate at least one parameter of the second signal based on at least one of the first signals.

According to a further embodiment of the present disclosure, a node for a wireless communication network is provided. The node comprises at least one processor and a memory containing instructions executable by said at least one processor, whereby the node is operative to determine a set of first signals having similar properties as a second signal when being received by a radio device. Further, the memory contains instructions executable by said at least one processor, whereby the node is operative to provide an indication of the set of first signals to the radio device for associating the set of first signals with the second signal. The association allows the radio device to estimate at least one parameter of the second signal based on at least one of the first signals.

According to a further embodiment of the present disclosure, a system is provided. The system comprises a node for a wireless communication network. Further, the system comprises a radio device. The node is configured to determine a set of first signals having similar properties as a second signal when being received by a radio device. Further, the node is configured to provide an indication of the set of first signals to the radio device for associating the set of first signals with the second signal. The radio device is configured to receive the indication from the node. Further, the radio device is configured to receive at least one of the first signals. Further, the radio device is configured to, in response to the indication, estimate at least one parameter of the second signal based on the at least one received first signal. Further, the radio device is configured to, based on the at least one estimated parameter, process at least one radio transmission from the wireless communication network.

According to a further embodiment of the present disclosure, a computer program or computer program product is provided, e.g., in the form of a non-transitory storage medium, which comprises program code to be executed by at least one processor of a radio device. Execution of the program code causes the radio device to receive an indication of a set of first signals for associating the set of first signals with a second signal. Further, execution of the program code causes the radio device to receive at least one of the first signals. Further, execution of the program code causes the radio device to, in response to the indication, estimate at least one parameter of the second signal based on the at least one received first signal. Further, execution of the program code causes the radio device to, based on the at least one estimated parameter, process at least one radio transmission from the wireless communication network.

According to a further embodiment of the present disclosure, a computer program or computer program product is provided, e.g., in the form of a non-transitory storage medium, which comprises program code to be executed by at least one processor of a node of a wireless communication network. Execution of the program code causes the node to determine a set of first signals having similar properties as a second signal when being received by a radio device. Further, execution of the program code causes the node to provide an indication of the set of first signals to the radio device for associating the set of first signals with the second signal. The association allows the radio device to estimate at least one parameter of the second signal based on at least one of the first signals.

Details of such embodiments and further embodiments will be apparent from the following detailed description of embodiments.

DETAILED DESCRIPTION OF EMBODIMENTS

In the following, concepts in accordance with exemplary embodiments of the present disclosure will be explained in more detail and with reference to the accompanying drawings. The illustrated embodiments relate to control of radio transmissions in a wireless communication network, specifically to control DL radio transmissions from the wireless communication network, e.g. a node thereof, to a radio device, in the following also referred to as UE. The node may be embodied as an access node which is connected to the UE via an air interface. The wireless communication network is assumed to be based on the NR technology. However, it is noted that the illustrated concepts may also be applied to other technologies, e.g., the LTE technology.

In the illustrated concepts, a UE receives an indication of a set of first signals for associating the set of first signals with a second signal. The set of first signals may comprise more than one signal. The radio device receives at least one of the first signals. In response to the indication, the radio device estimates at least one parameter of the second signal based on the at least one received first signal. Based on the at least one estimated parameter, the radio device processes at least one radio transmission from the wireless communication network. In particular, the indication indicates a QCL between the first signals of the set, particularly each of the first signals of the set or all first signals of the set, and the second signal. In this way the second signal, which constitutes a QCL target, can be simultaneously configured with multiple QCL sources. The second signal may be embodied as a DL signal. In response to receiving the indication, the UE may configure itself with a QCL between the first signals and the second signal, so that the UE establishes one or more QCL assumptions. In this regard, a derivation of a respective QCL assumption may be accomplished locally at the UE, e.g., by selecting one or more of the signals and/or otherwise combining the signals. Accordingly, a second signal may be configured with multiple QCL sources. In some scenarios, the UE may further be provided with instructions how to combine the multiple QCL sources into one QCL assumption, in order to estimate a certain parameter. Alternatively, the UE may be preconfigured, e.g. by specification, with instructions how to combine the multiple QCL sources into one QCL assumption, in order to estimate a certain parameter.

Figure 1:
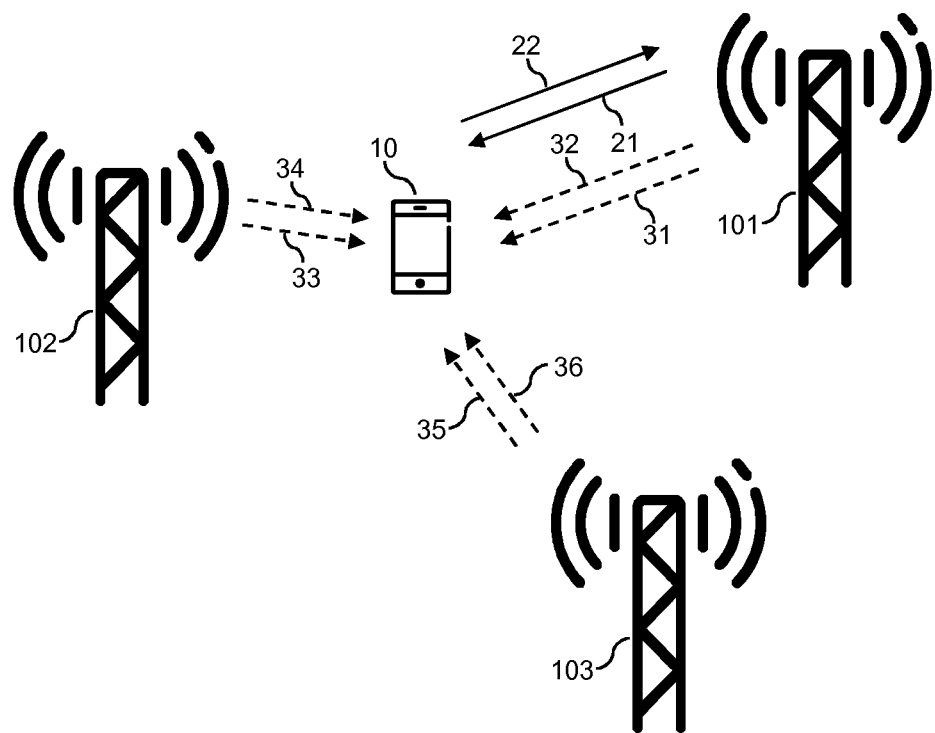
FIG. 1 schematically illustrates a wireless communication system in which radio transmissions are controlled according to an embodiment of the present disclosure.

FIG. 1 schematically illustrates an exemplary scenario in which a UE 10, e.g., a mobile phone, a tablet computer, or other kind of communication device, communicates with an access node 101 of the wireless communication network. In accordance with the assumed utilization of the NR technology, the access node 101 may also be referred to as gNB ("gNodeB"). In the scenario of FIG. 1, the communication between the UE 10 and the access node 100 involves DL (downlink) radio transmissions 21 from the access node 101 to the UE 10 and UL (uplink) radio transmissions 22 from the UE 10 to the access node 101. Further, the access node 101 transmits supporting signals 31, 32. The supporting signals 31, 32 may for example include synchronization signals, reference signals, and/or a broadcast channel conveying system information. In accordance with the assumed utilization of the NR technology, the supporting signals may in particular include a PSS, an SSS, a TRS, an PBCH, CSI-RS, or an SSB, demodulation reference signals (DMRS) of a control channel, in particular DMRS of a PDCCH (Physical DL Control Channel), demodulation reference signals (DMRS) of a data channel, in particular DMRS of a PDSCH (Physical DL Shared Channel).

In the example of FIG. 1, the access node 101 is assumed to be currently serving the UE 10. Further, also other access nodes may be present in the vicinity of the UE 10, such as access nodes 102, 103 illustrated in FIG. 1. These access nodes 102, 103 may correspond to gNBs as well. As illustrated, also the other access nodes 102, 103 transmit supporting signals which may be receivable by the UE 10, e.g., synchronization signals, reference signals, and/or a broadcast channel conveying system information, a PSS, an SSS, a TRS, an PBCH, CSI-RS, or an SSB. In the illustrated concepts, the UE 10 may benefit from combined utilization of a set of one or more of these supporting signals as QCL sources for a certain QCL target.

In some scenarios, the UE 10 is thus configured to use a set of signals $R = \{R_1, \ldots, R_n\}$ as QCL sources for a signal or channel, the QCL target. The signals in the set R can be tracking reference signals and/or SSBs, but could in other embodiments also include other DL signals, for example the above mentioned supporting signals. The configuration of the UE 10 with multiple QCL sources can be accomplished explicitly by indicating the multiple QCL sources in an RRC message. Alternatively, it would also be possible in accomplish at least a part of the configuration in an implicit manner. For example, the UE 10 could be configured with a rule to use all detected SSBs with the same cell ID as QCL sources. The signals corresponding to the multiple QCL sources can originate from the same node or from different nodes. For example, in the scenario of FIG. 1 the multiple configured QCL sources could all originate from the access node 101. Alternatively, the multiple configured QCL sources could also originate from the access node 102 or the access node 103.

In some scenarios the configuration of the set R of QCL sources may also involve configuring a relative or absolute power offset between the different signals of the set. For example, a message received by the UE 10 for configuring the set R of QCL sources could indicate a relative power offset of at least two of the QCL sources with respect to each other. Alternatively, an absolute power level could be indicated for one or more of the QCL sources.

In some scenarios the UE 10 may also be configured with one or more rules for combining the multiple QCL sources. Alternatively or in addition, the UE 10 may also decide the way to combine the QCL sources, e.g., by selecting one or more rules among multiple configured rules for combining the QCL sources and/or by adapting one or more parameters of a rule or rules for combining the QCL sources.

An exemplary rule for combining the QCL sources involves selecting the QCL source having the highest signal strength, optionally after scaling the signal strengths to consider the above-mentioned power offsets. However, other selection criteria could be used as well, e.g., selecting the QCL having the highest coverage range. Further, it is also possible to select multiple QCL sources from the set R. Having selected one or more QCL sources from the set R, the UE 10 may report the selected QCL source(s) to the access node 101.

Other rules for combining the QCL sources may involve averaging over all or a subset of the received QCL signals and estimating the parameter for the QCL target based on the average of the QCL signals used in the averaging. For example, the subset may include only a part of the received first signals. Further, a rule for combining the QCL sources could involve first calculating individual parameter estimates for each of the QCL sources or for one or more subsets of the set R (for example a part of the received QCL sources) and then calculate the parameter for the QCL target by combining the individual parameter estimates, e.g., by calculating a minimum value, a mean value, a median value and/or a maximum value of the individual parameter estimates.

In some scenarios, the QCL sources in the set R may be all of the same type. Possible types include QCL Type A, allowing for estimation of Doppler shift, Doppler spread, average delay, or delay spread for the QCL target; QCL Type B, allowing for estimation of Doppler shift or Doppler spread for the QCL target; QCL Type C, allowing for estimation of average delay or Doppler shift for the QCL target; and/or QCL Type D, allowing for estimating a spatial characteristic of the QCL target, e.g., in terms of a spatial beam configuration for receiving signals. In other scenarios, the QCL type may differ between at least some of the QCL sources in R. If the set R includes QCL sources of different QCL type, the UE 10 could combine only those QCL sources which have the same QCL type. For example, e.g., the UE could combine only the QCL sources with QCL type A to derive a QCL assumption with respect to QCL type A, e.g., in order to estimate Doppler shift, Doppler spread, average delay, and delay spread for the QCL target.

In some scenarios the UE 10 may also calculate multiple estimates of a certain parameter for the QCL target, using different QCL assumptions derived from the multiple QCL sources. These multiple estimates may for example be based on individual QCL sources in the set R or on one or more subsets of the QCL sources in the set R. The multiple estimates of the parameter may then be used in separate parallel processing of transmission, e.g., for parallel demodulation attempts of a DL transmission received by the UE 10. After that, a final demodulation result may then be selected based on these hypothetical demodulation attempts.

In a similar manner, the multiple estimates of the parameter could also be used for other hypothetical processing attempts, e.g., for decoding a DL transmission received by the UE 10.

The QCL target can be a CSI-RS reference signal. Alternatively, it can be a DMRS of a DL control channel, e.g., a DMRS of a PDCCH. As a further alternative, the QCL target could be a DMRS of a data channel, e.g., a DMRS of a PDSCH. In some scenarios, some or all the QCL sources in the set R could be non-static reference signals such as DMRS of a control channel, e.g., DMRS of a PDCCH, or DMRS of a data channel, e.g., DMRS of a PDSCH. In such cases, it should be noted that these signals can typically only be detected by the UE 10 if the UE 10 is being scheduled by the access node 101, 102, 103 transmitting the signals. For example, in the scenario of FIG. 1, the UE 10 could detect DMRS of a PDCCH or DMRS of a PDSCH from the access node 101, which is currently serving the UE 10, but not from the access node 102 or 103. As a further alternative, the QCL target could be the PDCCH or the PDSCH as such. The QCL target can also be a tracking reference signal which may enable estimation of Doppler spread and/or delay spread, e.g., a CSI-RS for tracking of the NR technology or TRS.

Figure 2:
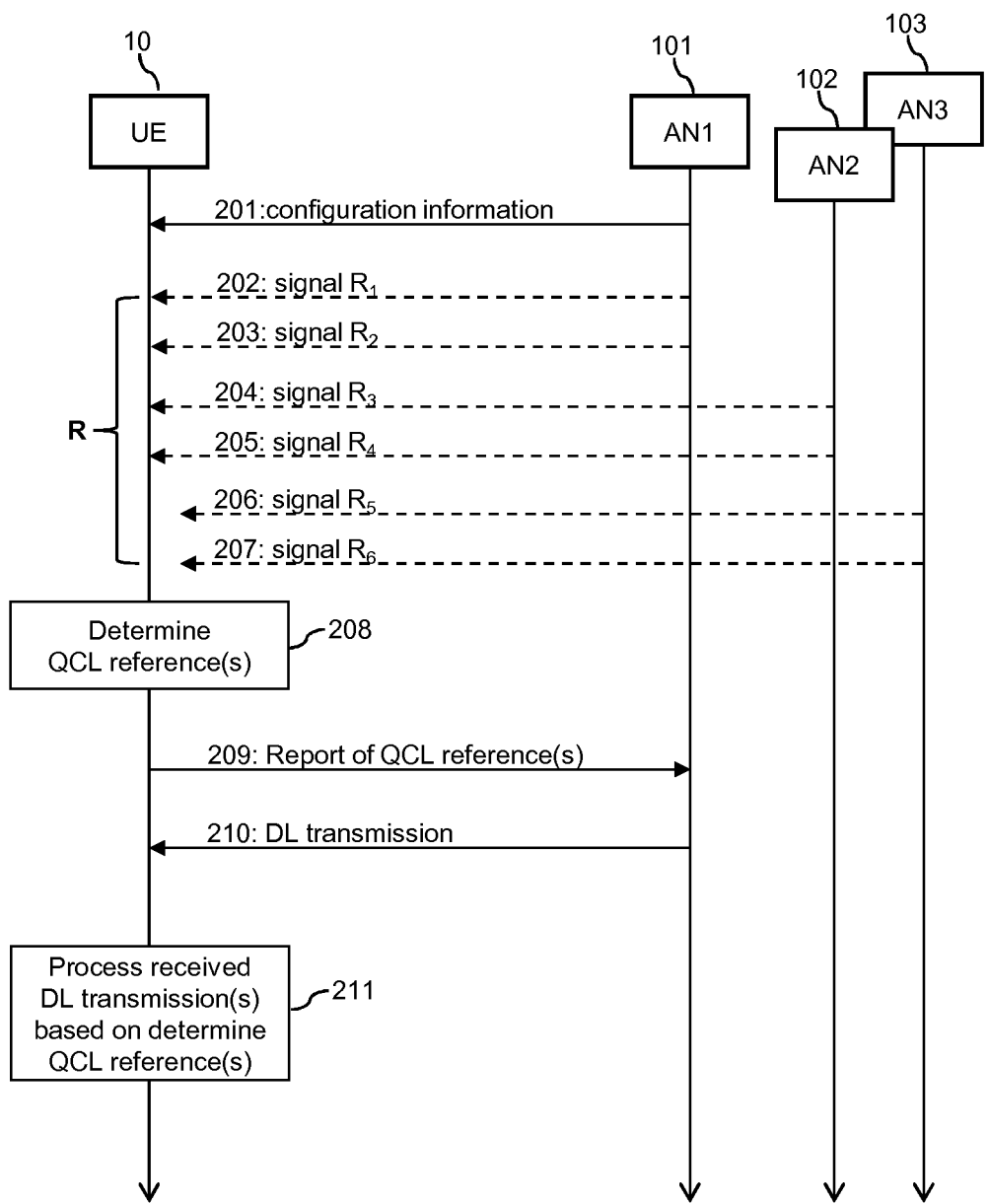
FIG. 2 illustrates an example of processes in which multiple reference signals are utilized according to an embodiment of the present disclosure.

FIG. 2 shows exemplary processes which are based on the above-described concepts. The processes of FIG. 2 involve the UE 10 and the access node (AN) 101. Optionally, the processes may also involve the access node 102 and/or the access node 103.

In the processes of FIG. 2, the access node 101 initially sends configuration information 201 to the UE 10. The configuration information 201 may for example be sent in an RRC message. The configuration information indicates to the UE 10 that a set R of multiple signals $R_1, R_2, R_3, R_4, R_5, R_6$ are QCL sources for a QCL target. The configuration information may indicate therefore that each signal or all signals of the set R is quasi co-located with the QCL target. The signals $R_1, R_2, R_3, R_4, R_5, R_6$ may for example correspond to the supporting signals 31, 32, 33, 34, 35, 36 illustrated in FIG. 1. As illustrated in FIG. 2, these signals may be from different access nodes, e.g., from the access node 101, the access node 102, and the access node 103. This may help to better support scenarios where the UE 10 moves between the coverage areas of the different access nodes 101, 102, 103. However, it would also be possible that all the signals originate from the same node, e.g., all from the access node 101. The signals $R_1, R_2, R_3, R_4, R_5, R_6$ may include one or more PSS, one or more SSS, one or more TRS, one or more PBCH, one or more CSI-RS, one or more SSB, one or more DMRS of a control channel, e.g., DMRS of a PDSCH, and/or one or more DMRS of a data channel, e.g., DMRS of a PDSCH. The QCL target may be embodied as a DL signal or DL channel and may include, for example, a CSI-RS, a DMRS of a PDCCH, a DRMS of a PDSCH, a tracking reference signal which may enable estimation of Doppler spread and/or delay spread, e.g., a CSI-RS for tracking of the NR technology or TRS, or the PDCCH or PDSCH.

As illustrated by broken arrows 202, 203, 204, 205, 206, 207, when the signals $R_1, R_2, R_3, R_4, R_5, R_6$ are transmitted by the access node(s) 101, 102, 103, the UE 10 receives at least some of the signals $R_1, R_2, R_3, R_4, R_5, R_6$. In the example of FIG. 2, it is assumed that the UE 10 does not receive the signals $R_5$, Re transmitted by the access node 103, e.g., because the UE 10 is outside the coverage area of the access node 103. However, the remaining received signals $R_1, R_2, R_3, R_4, R_5$, Re still enable the UE 10 to derive a QCL assumption, e.g., to determine one or more of the actually received signals $R_1, R_2, R_3, R_4$ to be used for estimating one or more parameters for the QCL target, as indicated by block 208. The determined one or more of the actually received signals $R_1, R_2, R_3, R_4$ are denoted "QCL reference(s)" in FIG. 2. The QCL target could for example be a CSI-RS transmitted by the access node 101. However, other QCL targets are possible as well, e.g., a DMRS of a PDCCH transmitted by the access node 101 or a DMRS of a PDSCH transmitted by the access node 101 or a tracking reference signal (which may enable estimation of Doppler spread and/or delay spread, e.g., a CSI-RS for tracking of the NR technology or TRS) transmitted by the access node 101.

As further illustrated, the UE 10 may also send a report 209 of a result of the determined QCL assumption to the access node 101. For example, the report 209 may indicate the signals selected by the UE 10 to be used for estimating one or more parameters for the QCL target. The access node 101 may use the information indicated by the report 209 as a basis for controlling DL transmissions to the UE 10. For example, the access node 101 may use the received report 209 for precoder selection for DL transmissions to the UE 10. Alternatively or additionally, the access node 101 may use the report 209 for selecting another access node 102, 103 whose first signal(s) is included in the report 209. Alternatively or additionally, the access node 101 may use the received report 209 for determining a new first signal(s) to configure for QCL, for example, to expand the existing QCL with this new first signal(s) or to configure a new QCL for the new first signal(s). Alternatively or additionally, the access node 101 may use the received report 209 for positioning the UE 10.

As further illustrated, the UE 10 then receives a DL transmission 210 from the access node 101. The DL transmission can for example be a transmission on a data channel, e.g., PDSCH, or a transmission on a control channel, e.g., PDCCH. As indicated by block 211, the UE 10 processes the received DL transmission based on the QCL reference(s) determined at block 208. For example, this may involve determining an estimate for the DMRS of the PDSCH or PDCCH of the access node 101 from the QCL reference(s) and demodulating the received DL transmission 210 based on the estimate obtained from the QCL reference(s).

Figure 3:
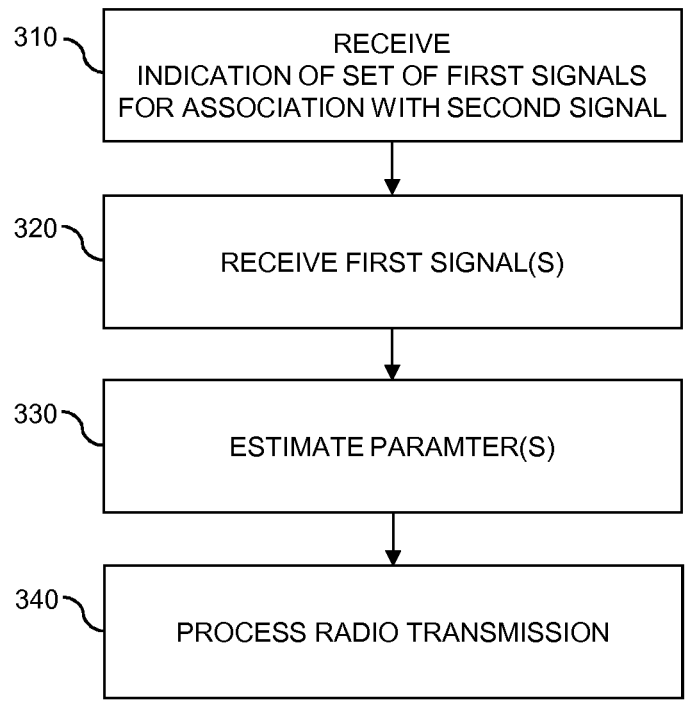
FIG. 3 shows a flowchart for schematically illustrating a method according to an embodiment of the present disclosure.

FIG. 3 shows a flowchart for illustrating a method of controlling radio transmissions. The method of FIG. 3 may be utilized for implementing the illustrated concepts in a radio device, such as the above-mentioned UE 10. If a processor-based implementation of the radio device is used, the steps of the method may be performed by one or more processors of the radio device. In such a case the radio device may further comprise a memory in which program code for implementing the below described functionalities is stored.

At step 310, the radio device receives an indication of a set of first signals for associating the set of first signals with a second signal. This indication may indicate that each of the first signals in the set or all first signals of the set may be quasi co-located with the second signal. In response to receiving the indication, the radio device may establish one or more QCL assumptions between the set of first signals and the second signals. For example, assuming N first signals, the radio device may establish N separate QCL assumptions between each one of the first signals of the set and the second signal. Alternatively, the radio device may establish one QCL assumption between multiple first signals of the set and the second signal. To this end, the radio device may combine the first signals in a suitable way, which will be described further below in detail.

The radio device may receive the indication from a node of the wireless communication network, such as the above-mentioned access node 101. The node may also transmit at least one of the signals. The radio device may receive the indication in an RRC message. However, other ways of conveying the indication could be used in addition or as an alternative, such as implicit signalling or DL control information.

In some scenarios, the indication may further indicate a QCL type for each of the signals. The QCL type may be the same for all of the signals. In some scenarios, the indication may indicate the QCL type individually for each of the signals. Accordingly, the QCL types can also differ among at least some of the signals.

In some scenarios, the indication further indicates a rule to be applied by the radio device for combining the signals.

Further, the indication may indicate a power offset of at least some of the signals. The power offset may be indicated in a relative terms or in absolute values.

In some scenarios, the radio device may use a preconfigured, e.g. by specification, rule to be applied by the radio device for combining the signals. In such a case, the indication may indicate a power offset of at least some of the signals. The power offset may be indicated in a relative terms or in absolute values. It is also possible that a power offset of at least some of the first signals are also preconfigured, e.g. by specification.

The first signals may include at least one synchronization signal, e.g., a PSS and/or an SSS. In addition or as an alternative, the first signals may include at least one reference signal, e.g., at least one demodulation reference signal of a control channel such as a DMRS of a PDCCH, and/or at least one demodulation reference signal of a data channel such as a DMRS of a PDSCH. In addition or as an alternative, the first signals may include a tracking reference signal which may enable estimation of Doppler spread and/or delay spread, e.g., a CSI-RS for tracking of the NR technology. In addition or as an alternative, the first signals may include at least one broadcast channel for conveying information for accessing the wireless communication network, such as a PBCH of the NR technology. In addition or as an alternative, the first signals may include at least one combination of at least one synchronization signal and a broadcast channel for conveying information for accessing the wireless communication network, such as an SSB of the NR technology. At least some of the first signals of the set may be of different types.

In some scenarios, the second signal is a reference signal. For example, the second signal could be a reference signal for estimating channel state information, such as a CSI-RS. According to a further example, the second signal could be a demodulation reference signal of a control channel, such as a DMRS of a PDCCH. According to a further example, the second signal could be a demodulation reference signal of a data channel, such as a DMRS of a PDSCH. According to a further example, the second signal can also be a tracking reference signal which may enable estimation of Doppler spread and/or delay spread, e.g., a CSI-RS for tracking of the NR technology or TRS. In some scenarios, the second signal is a DL channel, for example a DL control channel, such as a PDCCH, or a DL data channel, such as a PDSCH.

At step 320, the radio device receives at least one of the first signals. At least some of the first signals may be transmitted by different nodes of the wireless communication network.

At step 330, in response to the indication received at step 310, the radio device estimates at least one parameter of the second signal based on the at least one received first signal.

If at step 320 the radio device received at least two of the first signals, the radio device may combine the at least two received first signals and the radio device estimates the at least one parameter of the second signal based on the combined received first signals. For example, all first signals of the set may be received and used in the signal combination. Alternatively, only a subset of the received first signals of the set may be used in the signal combination.

The combining of the received first signals may involve selecting one or more of the received first signals. This selection may be based on a signal strength of the received first signals. If the indication further indicates a power offset of the received first signals the selection may be based on the signal strength of the received first signals and the indicated power offset. For example, the signal strengths may be scaled in accordance with the power offset, and the selection may be based on a comparison of the scaled signal strengths. For example, all received first signals may be selected for signal combination, e.g. based on their signal strength and optionally scaled by a respective power offset. Alternatively, only a subset of the received first signals may be selected for signal combination, e.g. based on their signal strength and optionally scaled by a respective power offset. It is also possible that only one signal may be selected, for example the strongest first signal.

In some scenarios, the radio device may also send a report indicating the selected first signals. The selected first signals could correspond to the first signals which have been selected for the combination of the first signals and thus may be used in the estimation of the at least one parameter of the second signal. The radio device may also send the report if the rule is preconfigured and not indicated by the indication.

In some scenarios, the combining of the received first signals may also be based on a QCL type of the received first signals. For example, the radio device could combine only those first signals that have the same QCL type.

In some scenarios, the combining of the first signals may involve estimating at least one individual parameter for each of the received first signals or one or more subsets of the received first signals and calculating the at least one estimated parameter based on the estimated individual parameters. This calculation may for example involve calculating at least one of a mean value, a minimum value, a maximum value, and a median value of the estimated individual parameters.

In some scenarios, the combining of the first signals may involve averaging over all received first signals or a subset of the received first signal to estimate the at least one parameter of the second signal thereupon.

At step 340, the radio device processes at least one radio transmission from the wireless communication network based on the parameter estimated at step 330. This may for example involve demodulation or decoding of a received DL transmission.

Figure 4:
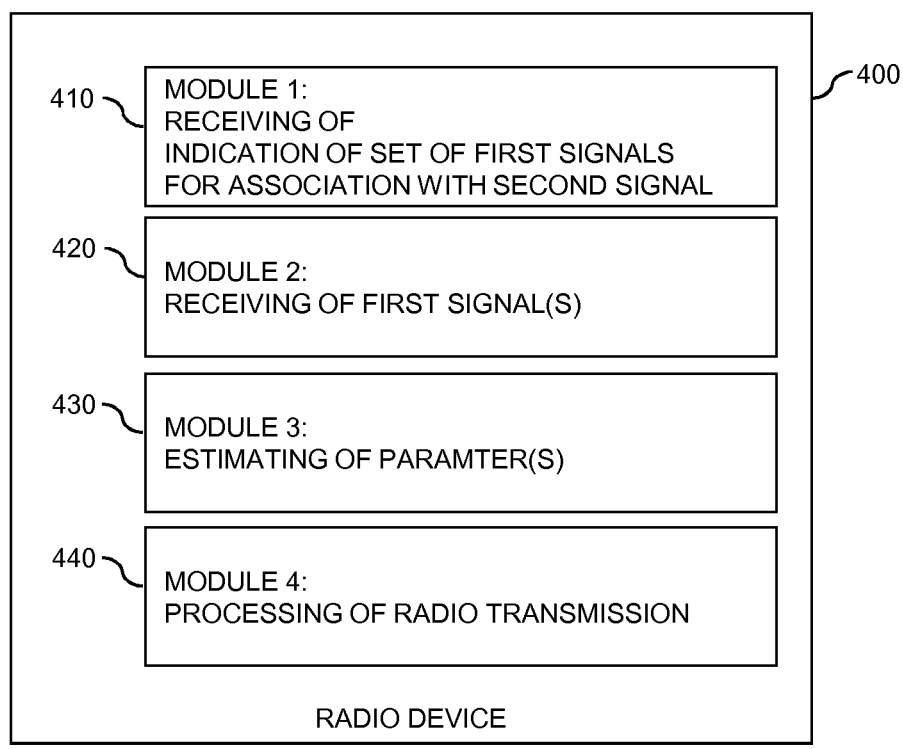
FIG. 4 shows a block diagram for illustrating functionalities of a radio device according to an embodiment of the present disclosure.

FIG. 4 shows a block diagram for illustrating functionalities of a radio device 400 which operates according to the method of FIG. 3. As illustrated, the radio device 400 may be provided with a module 410 configured to receive an indication for associating a set of first signals with a second signal, such as explained in connection with step 310. Further, the radio device 400 may be provided with a module 420 configured to receive at least one of the first signals, such as explained in connection with step 320. Further, radio device 400 may be provided with a module 430 configured to estimate at least one parameter of the second signal based on the received first signal(s), such as explained in connection with step 330. Further, radio device 400 may be provided with a module 440 configured to process a radio transmission from the wireless communication network based on the at least one estimated parameter of the second signal, such as explained in connection with step 330.

It is noted that the radio device 400 may include further modules for implementing other functionalities, such as known functionalities of a UE supporting the NR radio technology. Further, it is noted that the modules of the radio device 400 do not necessarily represent a hardware structure of the radio device 400, but may also correspond to functional elements, e.g., implemented by hardware, software, or a combination thereof.

Figure 5:
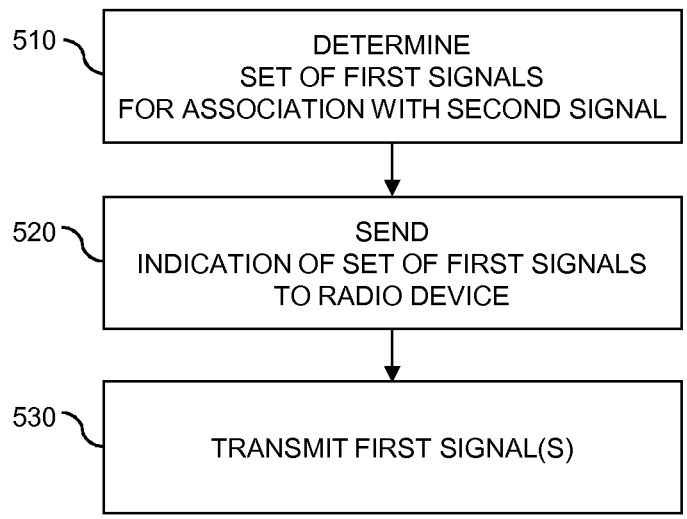
FIG. 5 shows a flowchart for schematically illustrating a further method according to an embodiment of the present disclosure.

FIG. 5 shows a flowchart for illustrating a method of controlling radio transmissions. The method of FIG. 5 may be utilized for implementing the illustrated concepts in a node of a wireless communication network, such as the above-mentioned access node 101. If a processor-based implementation of the node is used, the steps of the method may be performed by one or more processors of the node. In such a case the node may further comprise a memory in which program code for implementing the below described functionalities is stored.

At step 510, the node determines a set of first signals having similar properties as a second signal when being received by a radio device, such as the above-mentioned radio device 400 or UE 10.

The first signals may include at least one synchronization signal, e.g., a PSS and/or an SSS. In addition or as an alternative, the first signals may include at least one reference signal, e.g., at least one demodulation reference signal of a control channel such as a DMRS of a PDCCH, and/or at least one demodulation reference signal of a data channel such as a DMRS of a PDSCH. In addition or as an alternative, the first signals may include a tracking reference signal which may enable estimation of Doppler spread and/or delay spread, e.g., a CSI-RS for tracking of the NR technology. In addition or as an alternative, the first signals may include at least one broadcast channel for conveying information for accessing the wireless communication network, such as a PBCH of the NR technology. In addition or as an alternative, the first signals may include at least one combination of at least one synchronization signal and a broadcast channel for conveying information for accessing the wireless communication network, such as an SSB of the NR technology. At least some of the first signals of the set may be of different types.

In some scenarios, the second signal is a reference signal. For example, the second signal could be a reference signal for estimating channel state information, such as a CSI-RS. According to a further example, the second signal could be a demodulation reference signal of a control channel, such as a DMRS of a PDCCH. According to a further example, the second signal could be a demodulation reference signal of a data channel, such as a DMRS of a PDSCH. According to a further example, the second signal can also be a tracking reference signal which may enable estimation of Doppler spread and/or delay spread, e.g., a CSI-RS for tracking of the NR technology or TRS. In some scenarios, the second signal is a DL channel, for example a DL control channel, such as a PDCCH, or a DL data channel, such as a PDSCH.

At step 520, the node provides an indication of the set of first signals to the radio device for associating the set of first signals with the second signal. This association allows the radio device to estimate at least one parameter of the second signal based on at least one of the first signals. Specifically, in some embodiments, the indication may indicate that each of the first signals of the set of first signals or all first signals in the set are quasi co-located with the second signal. The radio device may then be enabled to establish one or more QCL assumptions between the set of first signals and the second signal based on at least one of the first signals.

The node may send the indication in an RRC message. However, other ways of conveying the indication could be used in addition or as an alternative, such as implicit signalling or DL control information.

In some scenarios, the indication may further indicate a QCL type for each of the signals. The QCL type may be the same for all of the signals. In some scenarios, the indication may indicate the QCL type individually for each of the signals. Accordingly, the QCL types can also differ among at least some of the signals.

In some scenarios, the indication further indicates a rule to be applied by the radio device for combining the signals. Further, the indication may indicate a power offset of at least some of the signals. The power offset may be indicated in a relative terms or in absolute values.

As explained in relation to the step 330, the combining of the received signals at the UE as indicated by the rule may involve selecting one or more of the first signals. This selection may be based on a signal strength of the first signals. If the indication further indicates a power offset of the first signals the selection may be based on the signal strength of the first signals and the indicated power offset. For example, the signal strengths may be scaled in accordance with the power offset, and the selection may be based on a comparison of the scaled signal strengths.

In some scenarios, the node may also receive a report indicating the selected first signals from the radio device. The node may also receive the report if the indication does not indicate any rule.

In some scenarios, the combining of the first signals as indicated by the rule may also be based on a QCL type of the first signals. For example, the radio device could combine only those first signals which have the same QCL type.

In some scenarios, the combining of the first signals may involve estimating at least one individual parameter for each of the first signals or a subset of the first signals and calculating the at least one estimated parameter based on the estimated individual parameters. This calculation may for example involve calculating at least one of a mean value, a minimum value, a maximum value, and a median value of the estimated individual parameters.

In some scenarios, the combining of the first signals may involve averaging over all first signals received by the UE 10 or a subset of these first signal to estimate the parameter of the second signal thereupon.

At step 530, the node may send at least one of the first signals. Further, the node may send a DL radio transmission to the radio device.

In some embodiments which may apply to some or all of the above described embodiments, the indication indicating a QCL between the set of first signals and the second signal may specify a list of the first signals of the set and may additionally specify the second signal. For example, the indication be part of a configuration message from the network to the radio device with which the radio device is to be configured with the second signal. This configuration may comprise an entry comprising the list. In such an example, the indication may be part of a RRC Information Element (IE) with which the radio device is configured with the second signal. The IE indicates the second signal. The IE may also indicate the list, e.g. as an entry in the IE. The entry may be, for example, a last entry in the IE.

In some embodiments which may apply to some or all of the above described embodiments and in which the indication may indicate multiple information, such as the QCL between the set and the second signal, the power offset, the QCL type and/or the rule, the indication may be sent in a distributed way, i.e. over separate messages. For example, the indication regarding the QCL and optionally the QCL type could be sent in one message (e.g. a RRC message or a DL control message such as a DL control information (DCI), and/or the indication of the rule and optionally the power offset may be sent in separate message (e.g. a RRC message or a DL control message such as a DL control information (DCI).

In some embodiments which may apply to some or all of the above described embodiments, a second signal (such as the above described reference signal(s) or the channel) may be configured with several QCL sources (such as the above described first signals). This measure may facilitate autonomous update of the QCL associations in the radio device or UE. The network, such as the node, may then inform the radio device that the QCL properties of the QCL target may be equal to the QCL properties of all the configured QCL sources. The radio device may use the QCL properties of any combination of the sources when demodulating the target second signal. The above embodiments provide techniques to configure several QCL sources for one second signal. One example of such a multi-source QCL configuration may be to configure one TRS with several different SSBs as QCL sources.

Figure 6:
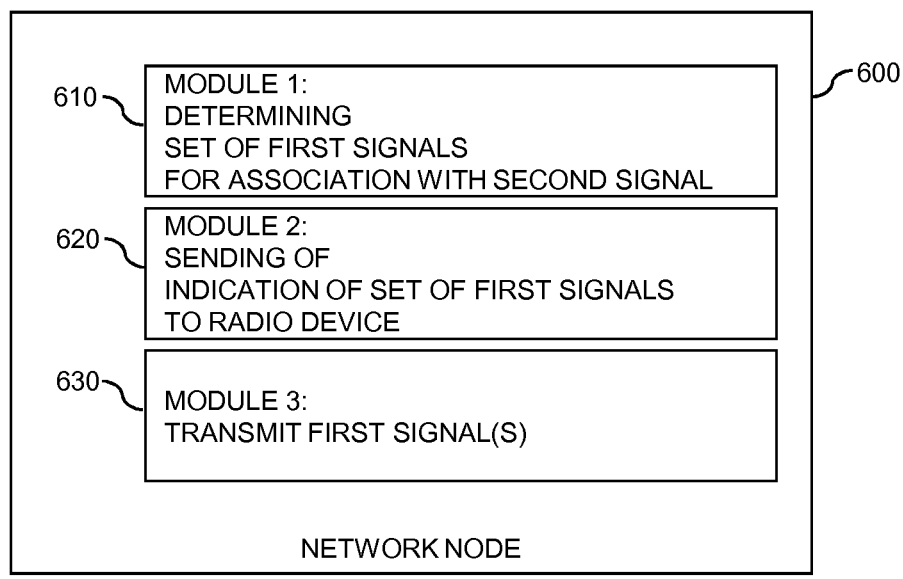
FIG. 6 shows a block diagram for illustrating functionalities of a network node according to an embodiment of the present disclosure.

FIG. 6 shows a block diagram for illustrating functionalities of a node 600 which operates according to the method of FIG. 5. As illustrated, the node 600 may be provided with a module 610 configured to determine a set of first signals, such as explained in connection with step 510. Further, the node 600 may be provided with a module 620 configured to send an indication for associating the set of first signals with a second signal to a radio device, such as explained in connection with step 520. Further, node 600 may be provided with a module 630 configured to transmit at least one of the first signals, such as explained in connection with step 530.

It is noted that the node 600 may include further modules for implementing other functionalities, such as known functionalities of a gNB of the NR radio technology or other kind of access node. Further, it is noted that the modules of the node 600 do not necessarily represent a hardware structure of the node 600, but may also correspond to functional elements, e.g., implemented by hardware, software, or a combination thereof.

It is to be understood that the methods of FIGS. 3 and 5 may also be combined, e.g., in a system including a radio device operating according to the method of FIG. 3 and a node operating according the method of FIG. 5.

Figure 7:
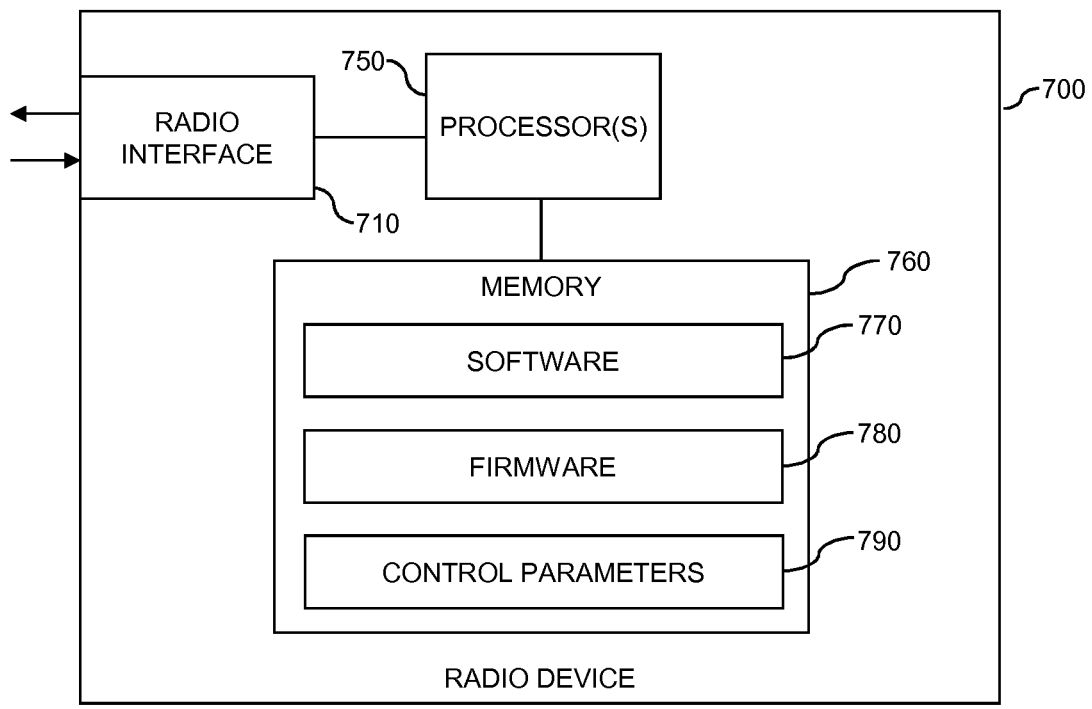
FIG. 7 schematically illustrates structures of a radio device according to an embodiment of the present disclosure.

FIG. 7 illustrates a processor-based implementation of a radio device 700 which may be used for implementing the above described concepts. For example, the structures as illustrated in FIG. 7 may be used for implementing the above-mentioned UE 10.

As illustrated, the radio device 700 may include a radio interface 710 for communicating with a wireless communication network, e.g., with an access node of the wireless communication network, such as the above-mentioned access node 101. The radio interface 710 may be used for receiving the above-mentioned control information, for sending control information, for performing DL or UL radio transmissions, or for receiving reference signals. The radio interface 710 may for example be based on the NR radio technology.

Further, the radio device 700 may include one or more processors 750 coupled to the radio interface 710 and a memory 760 coupled to the processor(s) 750. By way of example, the radio interface 710, the processor(s) 750, and the memory 760 could be coupled by one or more internal bus systems of the radio device 700. The memory 760 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 760 may include software 770, firmware 780, and/or control parameters 790. The memory 760 may include suitably configured program code to be executed by the processor(s) 750 so as to implement the above-described functionalities of a radio device, such as explained in connection with FIG. 3.

It is to be understood that the structures as illustrated in FIG. 7 are merely schematic and that the radio device 700 may actually include further components which, for the sake of clarity, have not been illustrated, e.g., further interfaces or processors. Also, it is to be understood that the memory 760 may include further program code for implementing known functionalities of a radio device, e.g., known functionalities of a UE. According to some embodiments, also a computer program may be provided for implementing functionalities of the radio device 700, e.g., in the form of a physical medium storing the program code and/or other data to be stored in the memory 760 or by making the program code available for download or by streaming.

Figure 8:
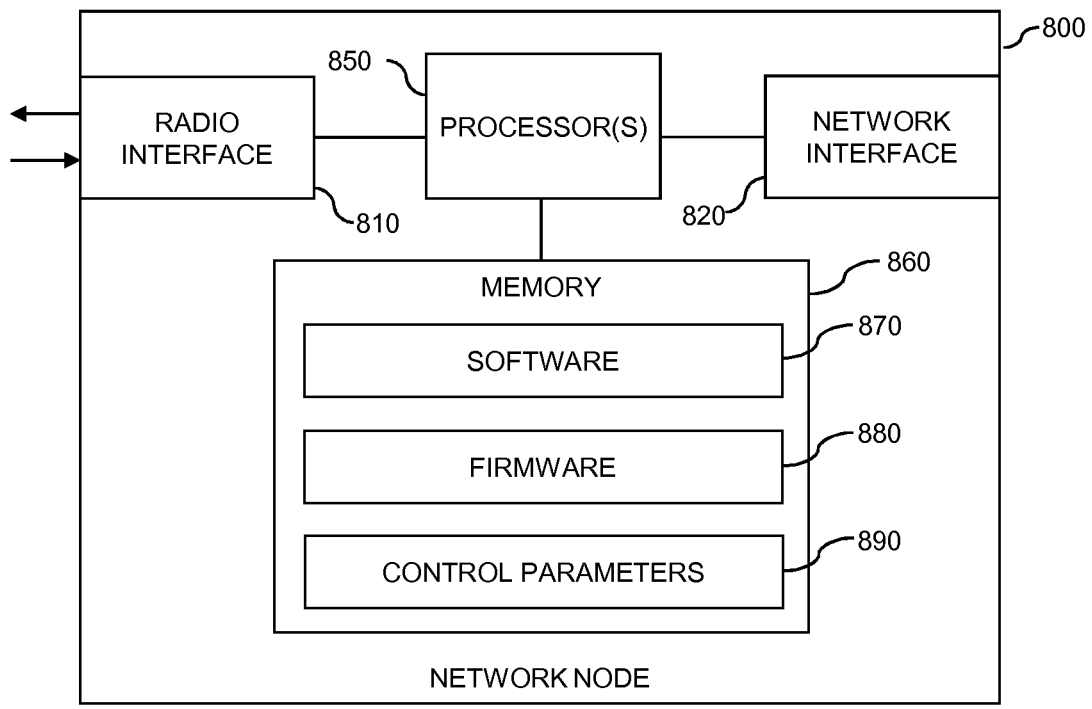
FIG. 8 schematically illustrates structures of a network node according to an embodiment of the present disclosure.

FIG. 8 illustrates a processor-based implementation of a network node 800 which may be used for implementing the above described concepts. For example, the structures as illustrated in FIG. 8 may be used for implementing an access node of the wireless communication network, such as the above-mentioned access node 101.

As illustrated, the network node 800 may include a radio interface 810 for communicating with radio devices, such as the above-mentioned radio device 400, 700 or UE 10 and/or other radio devices and UEs. The radio interface 810 may be used for sending the above-mentioned control information, for receiving control information, for performing DL or UL radio transmissions with one or more radio device, or for sending reference signals. The radio interface 810 may for example be based on the NR radio technology. Further, the network node 800 may include a network interface 820 for communicating with other nodes of a wireless communication network, e.g., access nodes or core network nodes.

Further, the network node 800 may include one or more processors 850 coupled to the interfaces 810, 820 and a memory 860 coupled to the processor(s) 850. By way of example, the interfaces 810, 820, the processor(s) 850, and the memory 860 could be coupled by one or more internal bus systems of the network node 800. The memory 860 may include a ROM, e.g., a flash ROM, a RAM, e.g., a DRAM or SRAM, a mass storage, e.g., a hard disk or solid state disk, or the like. As illustrated, the memory 860 may include software 870, firmware 880, and/or control parameters 890. The memory 860 may include suitably configured program code to be executed by the processor(s) 850 so as to implement the above-described functionalities of a network node, such as explained in connection with FIG. 5.

It is to be understood that the structures as illustrated in FIG. 8 are merely schematic and that the network node 800 may actually include further components which, for the sake of clarity, have not been illustrated, e.g., further interfaces or processors. Also, it is to be understood that the memory 860 may include further program code for implementing known functionalities of a network node, e.g., known functionalities of a gNB of the NR radio technology. According to some embodiments, also a computer program may be provided for implementing functionalities of the network node 800, e.g., in the form of a physical medium storing the program code and/or other data to be stored in the memory 860 or by making the program code available for download or by streaming.

As can be seen, the concepts as described above may be used for efficiently utilizing various types of supporting signals transmitted in a wireless communication network. In particular, a UE 10 may be configured with multiple QCL sources for a QCL target. In this way, for example a need of reconfiguration as a UE moves in the in the wireless communication network may be reduced. For example, even if a certain supporting signal, e.g., a CSI-RS or DMRS of a PDCCH cannot be detected by the UE in a situation, it may become detectable at a later time and then be used as QCL source without requiring reconfiguration of the UE.

It is to be understood that the examples and embodiments as explained above are merely illustrative and susceptible to various modifications. For example, the illustrated concepts may be applied in connection with various kinds of wireless communication technologies, without limitation to the above-mentioned examples of the LTE or NR technology. Further, the illustrated concepts may be applied in various kinds of radio devices, including mobile phones, portable computing devices, machine type communication devices, base stations, and relay stations. Moreover, it is to be understood that the above concepts may be implemented by using correspondingly designed software to be executed by one or more processors of an existing device, or by using dedicated device hardware. Further, it should be noted that the illustrated nodes or devices may each be implemented as a single device or as a system of multiple interacting devices.

In view of the above, embodiments of the present disclosure include:

Embodiment 1

A method of controlling radio transmission in a wireless communication network, the method comprising:

a radio device (10; 400; 700) receiving an indication of a set of first signals (31, 32, 33, 34, 35, 36) for associating the set of first signals (31, 32, 33, 34, 35, 36) with a second signal; and the radio device (10; 400; 700) receiving at least one of the first signals (31; 32, 33, 34, 35, 36);

in response to the indication, the radio device (10; 400; 700) estimating at least one parameter of the second signal based on the at least one received first signal; and based on the at least one estimated parameter, the radio device (10; 400; 700) processing at least one radio transmission (21) from the wireless communication network.

Embodiment 2

The method according to embodiment 1, wherein the indication indicates a quasi co-location between the first signals (31, 32, 33, 34, 35, 36) of the set of first signals (31, 32, 33, 34, 35, 36) and the second signal.

Embodiment 3

The method according to embodiment 2, wherein the indication further indicates a quasi co-location type for each of the first signals (31, 32, 33, 34, 35, 36).

Embodiment 4

The method according to embodiment 3, wherein the quasi co-location type is the same for all of the first signals (31, 32, 33, 34, 35, 36).

Embodiment 5

The method according to embodiment 3 or 4,
wherein the indication indicates the quasi co-location type individually for each of the first signals (31, 32, 33, 34, 35, 36).

Embodiment 6

The method according to any one of embodiments 1 to 5,
wherein the indication further indicates a rule to be applied by the radio device (10; 400; 700) for combining the first signals (31, 32, 33, 34, 35, 36).

Embodiment 7

The method according to any one of embodiments 1 to 5,
wherein the radio device (10; 400; 700) applies a preconfigured rule for combining the first signals (31, 32, 33, 34, 35, 36).

Embodiment 8

The method according to any one of embodiments 1 to 7,
wherein the indication further indicates a power offset of at least some of the first signals (31, 32, 33, 34, 35, 36).

Embodiment 9

The method according to any one of embodiments 1 to 8, comprising:
the radio device (10; 400; 700) receiving at least two of the first signals (31, 32, 33, 34, 35, 36);
the radio device (10; 400; 700) combining the at least two received first signals (31, 32, 33, 34, 35, 36); and
the radio device (10; 400; 700) estimating the at least one parameter of the second signal based on the combined received first signals (31, 32, 33, 34, 35, 36).

Embodiment 10

The method according to embodiment 9,
wherein said combining of the received signals (31, 32, 33, 34, 35, 36) comprises selecting one or more of the received first signals (31, 32, 33, 34, 35, 36).

Embodiment 11

The method according to embodiment 10,
wherein said selecting is based on a signal strength of the received first signals (31, 32, 33, 34, 35, 36).

Embodiment 12

The method according to embodiment 11,
wherein the indication further indicates a power offset of the first signals (31, 32, 33, 34, 35, 36); and
wherein said selecting is based on the signal strength of the received signals (31, 32, 33, 34, 35, 36) and the indicated power offset.

Embodiment 13

The method according to any one of embodiments 10 to 12, comprising:
the radio device (10; 400; 700) sending a report (209) indicating the selected first signals (31, 32, 33, 34, 35, 36).

Embodiment 14

The method according to any one of embodiments 9 to 13,
wherein said combining is based on a quasi co-location type of the received first signals (31, 32, 33, 34, 35, 36).

Embodiment 15

The method according to any one of embodiments 9 to 14,
wherein said combining comprises estimating at least one individual parameter for each of the received first signals (31, 32, 33, 34, 35, 36) and calculating the at least one estimated parameter based on the estimated individual parameters.

Embodiment 16

The method according to embodiment 15,
wherein said calculating comprises calculating at least one of a mean value, a minimum value, a maximum value, and a median value of the estimated individual parameters.

Embodiment 17

The method according to any one of embodiments 1 to 16,
wherein the second signal is a reference signal.

Embodiment 18

The method according to embodiment 17,
wherein the second signal is a reference signal for estimating channel state information.

Embodiment 19

The method according to embodiment 17,
wherein the second signal is a demodulation reference signal of a control channel.

Embodiment 20

The method according to embodiment 17,
wherein the second signal is a demodulation reference signal of a data channel.

Embodiment 21

The method according to any one of embodiments 1 to 20,
wherein the first signals (31, 32, 33, 34, 35, 36) comprise at least one synchronization signal.

Embodiment 22

The method according to any one of embodiments 1 to 21, wherein the first signals (31, 32, 33, 34, 35, 36) comprise at least one reference signal.

Embodiment 23

The method according to any one of embodiments 1 to 22, signal of a control channel.

Embodiment 24

The method according to any one of embodiments 1 to 23, wherein the first signals (31, 32, 33, 34, 35, 36) comprise at least one demodulation reference signal of a data channel.

Embodiment 25

The method according to any one of embodiments 1 to 24, wherein the first signals (31, 32, 33, 34, 35, 36) comprise a tracking reference signal.

Embodiment 26

The method according to any one of embodiments 1 to 25, wherein the first signals (31, 32, 33, 34, 35, 36) comprise at least one broadcast channel for conveying information for accessing the wireless communication network.

Embodiment 27

The method according to any one of embodiments 1 to 26, wherein the first signals (31, 32, 33, 34, 35, 36) comprise at least one combination of at least one synchronization signal and a broadcast channel for conveying information for accessing the wireless communication network.

Embodiment 28

The method according to any one of embodiments 1 to 27, wherein at least some of the first signals (31, 32, 33, 34, 35, 36) are of different types.

Embodiment 29

The method according to any one of embodiments 1 to 28, wherein at least some of the first signals (31, 32, 33, 34, 35, 36) are transmitted by different nodes (101, 102, 103; 400; 700) of the wireless communication network.

Embodiment 30

The method according to any one of embodiments 1 to 29, wherein the radio device (10; 400; 700) receives the indication from a node (101; 600; 800) of the wireless communication network.

Embodiment 31

The method according to embodiment 30, wherein the node (101; 600; 800) transmits at least one of the first signals (31, 32, 33, 34, 35, 36).

Embodiment 32

The method according to any one of embodiments 1 to 31, wherein the radio device (10; 400; 700) receives the indication in a Radio Resource Control message.

Embodiment 33

A method of controlling radio transmission in a wireless communication network, the method comprising:
a node (101; 600; 800) of the wireless communication network determining a set of first signals (31, 32, 33, 34, 35, 36) having similar properties as a second signal when being received by a radio device (10; 400; 700); and
the node (101; 600; 800) providing an indication of the set of first signals to the radio device (10; 400; 700) for associating the set of first signals (31, 32, 33, 34, 35, 36) with the second signal, said association allowing the radio device (10; 400; 700) to estimate at least one parameter of the second signal based on at least one of the first signals (31, 32, 33, 34, 35, 36).

Embodiment 34

The method according to embodiment 33, wherein the indication indicates a quasi co-location between the first signals (31, 32, 33, 34, 35, 36) of the set of first signals (31, 32, 33, 34, 35, 36) and the second signal.

Embodiment 35

The method according to embodiment 34, wherein the indication further indicates a quasi co-location type for each of the first signals (31, 32, 33, 34, 35, 36).

Embodiment 36

The method according to embodiment 35, wherein the quasi co-location type is the same for all of the first signals (31, 32, 33, 34, 35, 36).

Embodiment 37

The method according to embodiment 35 or 36, wherein the indication indicates the quasi co-location type individually for each of the first signals (31, 32, 33, 34, 35, 36).

Embodiment 38

The method according to any one of embodiments 33 to 37, wherein the indication further indicates a power offset of at least some of the first signals (31, 32, 33, 34, 35, 36).

Embodiment 39

The method according to any one of embodiments 33 to 38, wherein the indication further indicates a rule to be applied by the radio device (10; 400; 700) for combining the first signals (31, 32, 33, 34, 35, 36).

Embodiment 40

The method according to embodiment 39,
wherein said combining indicated by the rule comprises selecting one or more of the first signals (31, 32, 33, 34, 35, 36) received by the radio device (10; 400; 700).

Embodiment 41

The method according to embodiment 40,
wherein said selecting is based on a signal strength of the received first signals (31, 32, 33, 34, 35, 36).

Embodiment 42

The method according to embodiment 41,
wherein the indication further indicates a power offset of the first signals (31, 32, 33, 34, 35, 36); and
wherein said selecting is based on the signal strength of the received first signals (31, 32, 33, 34, 35, 36) and the indicated power offset.

Embodiment 43

The method according to any one of embodiments 40 to 42, comprising: the node (101; 600; 800) receiving a report (209) indicating the first signals (31, 32, 33, 34, 35, 36) selected by the radio device (10; 400; 700)

Embodiment 44

The method according to any one of embodiments 38 to 41,
wherein said combining indicated by the rule is based on a quasi co-location type of the received signals (31, 32, 33, 34, 35, 36).

Embodiment 45

The method according to any one of embodiments 39 to 44,
wherein said combining indicated by the rule comprises estimating at least one individual parameter for each of the received first signals (31, 32, 33, 34, 35, 36) and calculating the at least one estimated parameter based on the estimated individual parameters.

Embodiment 46

The method according to embodiment 45,
wherein said calculating comprises calculating at least one of a mean value, a minimum value, a maximum value, and a median value of the estimated individual parameters.

Embodiment 47

The method according to any one of embodiments 33 to 46,
wherein the second signal is a reference signal.

Embodiment 48

The method according to embodiment 47,
wherein the second signal is a reference signal for estimating channel state information.

Embodiment 49

The method according to embodiment 47,
wherein the second signal is a demodulation reference signal of a control channel.

Embodiment 50

The method according to embodiment 47,
wherein the second signal is a demodulation reference signal of a data channel.

Embodiment 51

The method according to any one of embodiments 33 to 50,
wherein the first signals (31, 32, 33, 34, 35, 36) comprise at least one synchronization signal.

Embodiment 52

The method according to any one of embodiments 33 to 51,
wherein the first signals (31, 32, 33, 34, 35, 36) comprise at least one reference signal.

Embodiment 53

The method according to any one of embodiments 33 to 52,
wherein the first signals (31, 32, 33, 34, 35, 36) comprise at least one demodulation reference signal of a control channel.

Embodiment 54

The method according to any one of embodiments 33 to 53,
wherein the first signals (31, 32, 33, 34, 35, 36) comprise at least one demodulation reference signal of a data channel.

Embodiment 55

The method according to any one of embodiments 33 to 54,
wherein the first signals (31, 32, 33, 34, 35, 36) comprise a tracking reference signal.

Embodiment 56

The method according to any one of embodiments 33 to 55,
wherein the first signals (31, 32, 33, 34, 35, 36) comprise at least one broadcast channel for conveying information for accessing the wireless communication network.

Embodiment 57

The method according to any one of embodiments 33 to 56,
wherein the first signals (31, 32, 33, 34, 35, 36) comprise at least one combination of at least one synchronization signal and a broadcast channel for conveying information for accessing the wireless communication network.

Embodiment 58

The method according to any one of embodiments 33 to 57,
wherein at least some of the first signals (31, 32, 33, 34, 35, 36) are of different types.

Embodiment 59

The method according to any one of embodiments 33 to 58,
wherein at least some of the first signals (31, 32, 33, 34, 35, 36) are transmitted by different nodes (101, 102, 103; 400; 700) of the wireless communication network.

Embodiment 60

The method according to embodiment to 59,
wherein the node (101; 600; 800) transmits at least one of the first signals (31, 32, 33, 34, 35, 36).

Embodiment 61

The method according to any one of embodiments 33 to 60,
wherein the node (101; 600; 800) sends the indication in a Radio Resource Control message.

Embodiment 62

A radio device (10; 400; 700) for a wireless communication network, the radio device (10; 400; 700) being configured to:
receive an indication of a set of first signals (31, 32, 33, 34, 35, 36) for associating the set of first signals (31, 32, 33, 34, 35, 36) with a second signal; and
receive at least one of the first signals (31; 32, 33, 34, 35, 36);
in response to the indication, estimate at least one parameter of the second signal based on the at least one received first signal; and
based on the at least one estimated parameter, process at least one radio transmission (21) from the wireless communication network.

Embodiment 63

The radio device (10; 400; 700) according to embodiment 62,
wherein the indication indicates a quasi co-location between the first signals (31, 32, 33, 34, 35, 36) of the set of first signals (31, 32, 33, 34, 35, 36) and the second signal.

Embodiment 64

The radio device (10; 400; 700) according to embodiment 63,
wherein the indication further indicates a quasi co-location type for each of the first signals (31, 32, 33, 34, 35, 36).

Embodiment 65

The radio device (10; 400; 700) according to embodiment 64,
wherein the quasi co-location type is the same for all of the first signals (31, 32, 33, 34, 35, 36).

Embodiment 66

The radio device (10; 400; 700) according to embodiment 64 or 65,
wherein the indication indicates the quasi co-location type individually for each of the first signals (31, 32, 33, 34, 35, 36).

Embodiment 67

The radio device (10; 400; 700) according to any one of embodiments 62 to 66,
wherein the indication further indicates a rule to be applied by the radio device (10; 400; 700) for combining the first signals (31, 32, 33, 34, 35, 36).

Embodiment 68 radio device (10; 400; 700) according to any one of embodiments 62 to 66,
wherein the radio device (10; 400; 700) is configured to apply a preconfigured rule for combining the first signals (31, 32, 33, 34, 35, 36).

Embodiment 69

The radio device (10; 400; 700) according to any one of embodiments 62 to 68,
wherein the indication further indicates a power offset of at least some of the first signals (31, 32, 33, 34, 35, 36).

Embodiment 70

The radio device (10; 400; 700) according to any one of embodiments 62 to 69,
wherein the radio device (10; 400; 700) is configured to:
receive at least two of the first signals (31, 32, 33, 34, 35, 36);
combine the at least two received first signals (31, 32, 33, 34, 35, 36); and
estimate the at least one parameter of the second signal based on the combined received first signals (31, 32, 33, 34, 35, 36).

Embodiment 71

The radio device (10; 400; 700) according to embodiment 70,
wherein the radio device (10; 400; 700) is configured to combine the received first signals (31, 32, 33, 34, 35, 36) by selecting one or more of the received signals (31, 32, 33, 34, 35, 36).

Embodiment 72

The radio device (10; 400; 700) according to embodiment 71,
wherein said selecting is based on a signal strength of the received first signals (31, 32, 33, 34, 35, 36).

Embodiment 73

The radio device (10; 400; 700) according to embodiment 72,
wherein the indication further indicates a power offset of the first signals (31, 32, 33, 34, 35, 36); and
wherein said selecting is based on the signal strength of the received first signals (31, 32, 33, 34, 35, 36) and the indicated power offset.

Embodiment 74

The radio device (10; 400; 700) according to any one of embodiments 71 to 73,
wherein the radio device (10; 400; 700) is configured to send a report (209) indicating the selected first signals (31, 32, 33, 34, 35, 36).

Embodiment 75

The radio device (10; 400; 700) according to any one of embodiments 70 to 74,
wherein the radio device (10; 400; 700) is configured to combine the received first signals (31, 32, 33, 34, 35, 36) based on a quasi co-location type of the received signals (31, 32, 33, 34, 35, 36).

Embodiment 76

The radio device (10; 400; 700) according to any one of embodiments 70 to 75,
wherein the radio device (10; 400; 700) is configured to combine the received first signals (31, 32, 33, 34, 35, 36) by estimating at least one individual parameter for each of the received first signals (31, 32, 33, 34, 35, 36) and calculating the at least one estimated parameter based on the estimated individual parameters.

Embodiment 77

The radio device (10; 400; 700) according to embodiment 76,
wherein said calculating comprises calculating at least one of a mean value, a minimum value, a maximum value, and a median value of the estimated individual parameters.

Embodiment 78

The radio device (10; 400; 700) according to any one of embodiments 62 to 77,
wherein the second signal is a reference signal.

Embodiment 79

The radio device (10; 400; 700) according to embodiment 78,
wherein the second signal is a reference signal for estimating channel state information.

Embodiment 80

The radio device (10; 400; 700) according to embodiment 78,
wherein the second signal is a demodulation reference signal of a control channel.

Embodiment 81

The radio device (10; 400; 700) according to embodiment 78,
wherein the second signal is a demodulation reference signal of a data channel.

Embodiment 82

The radio device (10; 400; 700) according to any one of embodiments 62 to 81,
wherein the first signals (31, 32, 33, 34, 35, 36) comprise at least one synchronization signal.

Embodiment 83

The radio device (10; 400; 700) according to any one of embodiments 62 to 82,
wherein the first signals (31, 32, 33, 34, 35, 36) comprise at least one reference signal.

Embodiment 84

The radio device (10; 400; 700) according to any one of embodiments 62 to 83,
wherein the first signals (31, 32, 33, 34, 35, 36) comprise at least one demodulation reference signal of a control channel.

Embodiment 85

The radio device (10; 400; 700) according to any one of embodiments 62 to 84,
wherein the first signals (31, 32, 33, 34, 35, 36) comprise at least one demodulation reference signal of a data channel.

Embodiment 86

The radio device (10; 400; 700) according to any one of embodiments 62 to 85,
wherein the first signals (31, 32, 33, 34, 35, 36) comprise a tracking reference signal.

Embodiment 87

The radio device (10; 400; 700) according to any one of embodiments 62 to 86,
wherein the first signals (31, 32, 33, 34, 35, 36) comprise at least one broadcast channel for conveying information for accessing the wireless communication network.

Embodiment 88

The radio device (10; 400; 700) according to any one of embodiments 62 to 87,
wherein the first signals (31, 32, 33, 34, 35, 36) comprise at least one combination of at least one synchronization signal and a broadcast channel for conveying information for accessing the wireless communication network.

Embodiment 89

The radio device (10; 400; 700) according to any one of embodiments 62 to 88,
wherein at least some of the first signals (31, 32, 33, 34, 35, 36) are of different types.

Embodiment 90

The radio device (10; 400; 700) according to any one of embodiments 62 to 89,
wherein at least some of the first signals (31, 32, 33, 34, 35, 36) are transmitted by different nodes (101, 102, 103; 400; 700) of the wireless communication network.

Embodiment 91

The radio device (10; 400; 700) according to any one of embodiments 62 to 90,
wherein the radio device (10; 400; 700) is configured to receive the indication from a node (101; 600; 800) of the wireless communication network.

Embodiment 92

The radio device (10; 400; 700) according to embodiment 91,
wherein the node (101; 600; 800) transmits at least one of the first signals (31, 32, 33, 34, 35, 36).

Embodiment 93

The radio device (10; 400; 700) according to any one of embodiments 61 to 92,
wherein the radio device (10; 400; 700) is configured to receive the indication in a Radio Resource Control message.

Embodiment 94

The radio device (10; 900; 1200) according to embodiment 62,
wherein the radio device (10; 400; 700) is configured to perform the steps of a method according to any one of embodiments 1 to 31.

Embodiment 95

The radio device (10; 400; 700) according to any one of embodiments 62 to 94, comprising:
at least one processor (750) and a memory containing instructions executable by said at least one processor (750), whereby the radio device (10; 400; 700) is operative to perform the steps of a method according to any one of embodiments 1 to 31.

Embodiment 96

A node (101; 600; 800) for a wireless communication network, the node (101; 600; 800) being configured to:
determine a set of first signals (31, 32, 33, 34, 35, 36) having similar properties as a second signal when being received by a radio device (10; 400; 700); and
provide an indication of the set of first signals to the radio device (10; 400; 700) for associating the set of first signals (31, 32, 33, 34, 35, 36) with the second signal, said association allowing the radio device (10; 400; 700) to estimate at least one parameter of the second signal based on at least one of the first signals (31, 32, 33, 34, 35, 36).

Embodiment 97

The node (101; 600; 800) according to embodiment 96,
wherein the indication indicates a quasi co-location between the first signals (31, 32, 33, 34, 35, 36) of the set of first signals (31, 32, 33, 34, 35, 36) and the second signal.

Embodiment 98

The node (101; 600; 800) according to embodiment 97,
wherein the indication further indicates a quasi co-location type for each of the first signals (31, 32, 33, 34, 35, 36).

Embodiment 99

The node (101; 600; 800) according to embodiment 98,
wherein the quasi co-location type is the same for all of the first signals (31, 32, 33, 34, 35, 36).

Embodiment 100

The node (101; 600; 800) according to embodiment 97 or 98, wherein the indication indicates the quasi co-location type individually for each of the first signals (31, 32, 33, 34, 35, 36).

Embodiment 101

The node (101; 600; 800) according to any one of embodiments 96 to 100,
wherein the indication further indicates a power offset of at least some of the first signals (31, 32, 33, 34, 35, 36).

Embodiment 102

The node (101; 600; 800) according to any one of embodiments 96 to 101,
wherein the indication further indicates a rule to be applied by the radio device (10; 400; 700) for combining the first signals (31, 32, 33, 34, 35, 36).

Embodiment 103

The node (101; 600; 800) according to embodiment 102,
wherein said combining indicated by the rule comprises selecting one or more of the first signals (31, 32, 33, 34, 35, 36) received by the radio device (10; 400; 700).

Embodiment 104

The node (101; 600; 800) according to embodiment 103,
wherein said selecting is based on a signal strength of the received first signals (31, 32, 33, 34, 35, 36).

Embodiment 105

The node (101; 600; 800) according to embodiment 104,
wherein the indication further indicates a power offset of the first signals (31, 32, 33, 34, 35, 36); and
wherein said selecting is based on the signal strength of the received first signals (31, 32, 33, 34, 35, 36) and the indicated power offset.

Embodiment 106

The node (101; 600; 800) according to any one of embodiments 103 to 105,
wherein the node (101; 600; 800) is configured to receive a report (209) indicating the first signals (31, 32, 33, 34, 35, 36) selected by the radio device (10; 400; 700)

Embodiment 107

The node (101; 600; 800) according to any one of embodiments 102 to 106,
wherein said combining indicated by the rule is based on a quasi co-location type of the received signals (31, 32, 33, 34, 35, 36).

Embodiment 108

The node (101; 600; 800) according to any one of embodiments 102 to 107,
wherein said combining indicated by the rule comprises estimating at least one individual parameter for each of the received first signals (31, 32, 33, 34, 35, 36) and calculating the at least one estimated parameter based on the estimated individual parameters.

Embodiment 109

The node (101; 600; 800) according to embodiment 108, wherein said calculating comprises calculating at least one of a mean value, a minimum value, a maximum value, and a median value of the estimated individual parameters.

Embodiment 110

The node (101; 600; 800) according to any one of embodiments 96 to 108,
wherein the second signal is a reference signal.

Embodiment 111

The node (101; 600; 800) according to embodiment 110, wherein the second signal is a reference signal for estimating channel state information.

Embodiment 112

The node (101; 600; 800) according to embodiment 110, wherein the second signal is a demodulation reference signal of a control channel.

Embodiment 113

The node (101; 600; 800) according to embodiment 110, wherein the second signal is a demodulation reference signal of a data channel.

Embodiment 114

The node (101; 600; 800) according to any one of embodiments 96 to 113,
wherein the first signals (31, 32, 33, 34, 35, 36) comprise at least one synchronization signal.

Embodiment 115

The node (101; 600; 800) according to any one of embodiments 96 to 114,
wherein the first signals (31, 32, 33, 34, 35, 36) comprise at least one reference signal.

Embodiment 116

The node (101; 600; 800) according to any one of embodiments 96 to 115, signal of a control channel.

Embodiment 117

The node (101; 600; 800) according to any one of embodiments 96 to 116,
wherein the first signals (31, 32, 33, 34, 35, 36) comprise at least one demodulation reference signal of a data channel.

Embodiment 118

The node (101; 600; 800) according to any one of embodiments 96 to 117,
wherein the first signals (31, 32, 33, 34, 35, 36) comprise a tracking reference signal.

Embodiment 119

The node (101; 600; 800) according to any one of embodiments 96 to 119,
wherein the first signals (31, 32, 33, 34, 35, 36) comprise at least one broadcast channel for conveying information for accessing the wireless communication network.

Embodiment 120

The node (101; 600; 800) according to any one of embodiments 96 to 120,
wherein the first signals (31, 32, 33, 34, 35, 36) comprise at least one combination of at least one synchronization signal and a broadcast channel for conveying information for accessing the wireless communication network.

Embodiment 121

The node (101; 600; 800) according to any one of embodiments 96 to 121,
wherein at least some of the first signals (31, 32, 33, 34, 35, 36) are of different types.

Embodiment 122

The node (101; 600; 800) according to any one of embodiments 96 to 122,
wherein at least some of the first signals (31, 32, 33, 34, 35, 36) are transmitted by different nodes (101, 102, 103; 400; 700) of the wireless communication network.

Embodiment 123

The node (101; 600; 800) according to embodiment to 123, wherein the node (101; 600; 800) transmits at least one of the first signals (31, 32, 33, 34, 35, 36).

Embodiment 124

The node (101; 600; 800) according to any one of embodiments 96 to 124,
wherein the node (101; 600; 800) is configured to send the indication in a Radio Resource Control message.

Embodiment 125

The node (101; 600; 800) according to embodiment 96, wherein the node (101; 800; 800) is configured to perform the steps of a method according to any one of embodiments 34 to 61.

Embodiment 126

The node (100; 1100; 1300) according to any one of embodiments 96 to 126, comprising:
at least one processor (850) and a memory (860) containing instructions executable by said at least one processor (850), whereby the node (100; 1100; 1300) is operative to perform the steps of a method according to any one of embodiments 33 to 61.

Embodiment 127

A system, comprising:
a node (101; 600; 800) of a wireless communication network; and
a radio device (10; 400; 700),
the node (101; 600; 800) being configured to:
determine a set of first signals (31, 32, 33, 34, 35, 36) having similar properties as a second signal when being received by a radio device (10; 400; 700); and
provide an indication of the set of first signals to the radio device (10; 400; 700) for associating the set of first signals (31, 32, 33, 34, 35, 36) with the second signal, the radio device (10; 400; 700) being configured to:
receive the indication from the node (101; 600; 800);
receive at least one of the first signals (31; 32, 33, 34, 35, 36);
in response to the indication, estimate at least one parameter of the second signal based on the at least one received first signal (31; 32, 33, 34, 35, 36); and
based on the at least one estimated parameter, process at least one radio transmission (21) from the wireless communication network.

Embodiment 128

A computer program comprising program code to be executed by at least one processor (750) of a radio device (10; 400; 700), wherein execution of the program code causes the radio device (10; 400; 700) to perform the steps of a method according to any one of embodiments 1 to 32.

Embodiment 129

A computer program product comprising program code to be executed by at least one processor (750) of a radio device (10; 400; 700), wherein execution of the program code causes the radio device (10; 400; 700) to perform the steps of a method according to any one of embodiments 1 to 32.

Embodiment 130

A computer program comprising program code to be executed by at least one processor (850) of a node (101; 600; 800) of a wireless communication network, wherein execution of the program code causes the node (101; 600; 800) to perform the steps of a method according to any one of embodiments 33 to 61.

Embodiment 131

A computer program comprising program code to be executed by at least one processor (850) of a node (101; 600; 800) of a wireless communication network, wherein execution of the program code causes the node (101; 600; 800) to perform the steps of a method according to any one of embodiments 33 to 61.

The invention claimed is:

1. A method of controlling radio transmission in a wireless communication network, the method comprising:
receiving, by a radio device, an indication of a set of first signals for associating the set of first signals with a second signal, wherein the indication indicates a quasi co-location (QCL) between the first signals in the set and the second signal and indicates a rule to be applied by the radio device, the rule including a selection criterion for selecting, from the set of first signals, one or more first signals, the rule including an instruction of how to combine the selected one or more first signals for estimating at least one parameter of the second signal;
receiving, by the radio device, two or more of the first signals in the set;
deriving, by the radio device, based on the indicated rule, a QCL assumption by selecting and combining the one or more first signals for estimating the at least one parameter of the second signal;
estimating, by the radio device, the at least one parameter of the second signal based on the derived QCL assumption; and
based on the at least one estimated parameter of the second signal, processing, by the radio device, at least one radio transmission from the wireless communication network.

2. The method according to claim 1, wherein the indication further indicates a quasi co-location type individually for each of the first signals.

3. The method according to claim 1, wherein the second signal is a reference signal for estimating channel state information, a demodulation reference signal of a control channel, or a demodulation reference signal of a data channel.

4. The method according to claim 1, wherein the first signals comprise at least one synchronization signal, at least one demodulation reference signal of a control channel, at least one demodulation reference signal of a data channel, a tracking reference signal, at least one broadcast channel for conveying information for accessing the wireless communication network, and/or at least one combination of at least one synchronization signal and a broadcast channel for conveying information for accessing the wireless communication network.

5. The method according to claim 1, wherein the indication is received in a Radio Resource Control message from a node of the wireless communication network.

6. A method of controlling radio transmission in a wireless communication network, the method comprising:
determining, by a node of the wireless communication network, a set of first signals having similar properties as a second signal when being received by a radio device; and
providing, by the node, to a user equipment (UE), an indication of the set of first signals to the radio device for associating the set of first signals with the second signal, wherein the indication indicates a quasi co-location (QCL) between the first signals in the set and the second signal and indicates a rule to be applied by the radio device, the rule including a selection criterion for selecting, from the set of first signals, one or more first signals, the rule including an instruction of how to combine the selected one or more first signals for estimating at least one parameter of the second signal;

receiving, by the node, from the UE, a report based on a QCL assumption, the QCL assumption being derived by the UE by selecting and combining the one or more first signals for estimating the at least one parameter of the second signal, based on the indication provided by the node; and processing, by the node, the report for controlling at least one radio transmission to the UE.

7. The method according to claim 6, wherein the indication further indicates a quasi co-location type individually for each of the first signals.

8. The method according to claim 6, wherein the second signal is a reference signal for estimating channel state information, a demodulation reference signal of a control channel, or a demodulation reference signal of a data channel.

9. The method according to claim 6, wherein the first signals comprise at least one synchronization signal, at least one reference signal, at least one demodulation reference signal of a control channel, at least one demodulation reference signal of a data channel, a tracking reference signal, at least one broadcast channel for conveying information for accessing the wireless communication network, and/or at least one combination of at least one synchronization signal and a broadcast channel for conveying information for accessing the wireless communication network.

10. The method according to claim 6, further comprising sending, by the node, the indication in a Radio Resource Control message.

11. A radio device for a wireless communication network, the radio device comprising:
at least one processor and a memory containing instructions executable by said at least one processor, whereby the radio device is operative to:
receive an indication of a set of first signals for associating the set of first signals with a second signal, wherein the indication indicates a quasi co-location (QCL) between the first signals in the set and the second signal and indicates a rule to be applied by the radio device, the rule including a selection criterion for selecting, from the set of first signals, one or more first signals, the rule including an instruction of how to combine the selected one or more first signals for estimating at least one parameter of the second signal;
receive two or more of the first signals in the set;
derive, based on the indicated rule, a QCL assumption by selecting and combining the one or more first signals for estimating the at least one parameter of the second signal;
estimate the at least one parameter of the second signal based on the derived QCL assumption; and
based on the at least one estimated parameter, process at least one radio transmission from the wireless communication network.

12. A node for a wireless communication network, the node comprising:
at least one processor and a memory containing instructions executable by said at least one processor, whereby the node is operative to:
determine a set of first signals having similar properties as a second signal when being received by a radio device; and
provide, to a user equipment (UE), an indication of the set of first signals to the radio device for associating the set of first signals with the second signal, wherein the indication indicates a quasi co-location (QCL) between the first signals in the set and the second signal and indicates a rule to be applied by the radio device, the rule including a selection criterion for selecting, from the set of first signals, one or more first signals, the rule including an instruction of how to combine the selected one or more first signals for estimating at least one parameter of the second signal;
receive, from the UE, a report based on a QCL assumption, the QCL assumption being derived by the UE by selecting and combining the one or more first signals for estimating the at least one parameter of the second signal, based on the indication provided by the node; and
process the report for controlling at least one radio transmission to the UE.

13. The method according to claim 1, wherein the rule specifies how the radio device is to combine the two or more received first signals for estimating the at least one parameter of the second signal from the combination.

14. The method according to claim 13, wherein the method further comprises determining, from the rule indicated by the indication, how to combine the two or more received first signals for estimating the at least one parameter of the second signal from the combination, and wherein said estimating comprises:
combining the two or more received first signals according to said determining; and
estimating the at least one parameter of the second signal based on the combination of the two or more received first signals resulting from said combining.

15. The method according to claim 1, wherein, according to the rule, the radio device is to combine the two or more received first signals by selecting one or more of the two or more received first signals to use for estimating the at least one parameter of the second signal.

16. The method according to claim 15, wherein, according to the rule, the one or more received first signals that the radio device is to select to use for estimating the at least one parameter of the second signal is:
whichever one of the two or more received first signals has a highest signal strength;
whichever one of the two or more received first signals has a highest signal strength as offset by a power offset indicated by the indication; or
whichever one of the two or more received first signals has a highest coverage range.

17. The method according to claim 15, further comprising sending, by the radio device, a report indicating the one or more selected first signals.

18. The method according to claim 1, wherein, according to the rule, the radio device is to:
calculate a combined value over the two or more first signals received, or a subset thereof, and estimate the at least one parameter of the second signal based on the combined value; or
calculate individual parameter estimates for the two or more first signals received, respectively, and calculate the at least one parameter of the second signal by combining the individual parameter estimates.

19. The method according to claim 1, wherein said estimating according to the rule comprises estimating at least one individual parameter for each of the received first signals and calculating the at least one estimated parameter of the second signal based on the estimated individual parameters.

20. The method according to claim 6, wherein the rule specifies how the radio device is to combine the two or more received first signals for estimating the at least one parameter of the second signal from the combination.

21. The method according to claim 6, wherein, according to the rule, the radio device is to combine the two or more received first signals by selecting one or more of the two or more received first signals to use for estimating the at least one parameter of the second signal.

* * * * *